United States Patent Office 3,431,066
Patented Mar. 4, 1969

3,431,066
METHOD FOR PRODUCING YTTRIUM ALUMINUM OXIDE GARNET CRYSTALS
Russell Seitz, Elberon, N.J., assignor of one-third to Albert C. Nolte, Jr., New York, N.Y.
No Drawing. Filed Sept. 24, 1965, Ser. No. 490,069
U.S. Cl. 23—20     1 Claim
Int. Cl. C22b 59/00

ABSTRACT OF THE DISCLOSURE

Yttrium aluminum oxide garnet crystals are produced by reacting yttrium oxide and aluminum oxide in molten sodium aluminum fluoride and then cooling the melt to crystallize thereout the resultant yttrium aluminum oxide.

---

This invention relates to the production of a laser material. More specifically this invention relates to the method of producing laser crystals employing an improved crystal growing technique.

Crystals that are currently employed in lasers are produced under high temperatures and extremely severe and controlled conditions. The crystals produced under these conditions are generally expensive to manufacture as well as difficult to grow and shape to the desired size.

It is therefore an object of the present invention to provide a method for growing laser crystals without the need for expensive and complex control equipment.

According to the invention, sodium aluminum fluoride is employed as a solvent for the growth of a yttrium aluminum garnet crystal (YAG) which may be employed in a laser. The sodium aluminum fluoride $Na_3AlF_6$ is first heated to a molten state at a temperature in excess of 900 degrees centigrade. Corresponding quantities of yttrium oxide $Y_2O_3$ and aluminum oxide $Al_2O_3$, in powdered form, are added to the molten solution and dissolved. The temperature of the molten solution may be raised slightly to dissolve out any recrystallized centers that form from the reaction of the powdered materials forming the yttrium aluminum oxide.

When the powdered materials containing the yttrium oxide and the aluminum oxide are added and dissolved in the molten solution of sodium aluminum fluoride the following chemical reaction takes place:

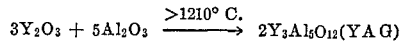
$$3Y_2O_3 + 5Al_2O_3 \xrightarrow{>1210° C.} 2Y_3Al_5O_{12}(YAG)$$

The yttrium oxide and the aluminum oxide are added in powdered form in quantities corresponding to their molecular weights indicated in the above chemical reaction so as to produce, while dissolved in the molten solution, yttrium aluminum oxide. The temperature of the solution is then lowered slowly to permit the yttrium aluminum oxide to crystallize out of the solution. By employing suitable seeds of YAG material it is possible to produce within the molten solution one large yttrium aluminum oxide crystal suitable for use in lasers. Moreover, by controlling the temperature of the molten solution, the amount and rate of aluminum oxide and yttrium oxide added to the molten solution, it is possible to control the shape and configuration of the yttrium aluminum crystals. This process according to the invention has the advantage that it may be performed under ordinary laboratory conditions without the use of expensive refractory equipment and permits the technician to more actively participate in controlling the growth of the crystal as it is formed in the molten solution. Moreover, this process may be employed for the growth of other bimetallic oxides, by employing a molten solution, to which the constituent metal oxides are soluble within, so that the oxides are permitted to freely chemically react within the solution to form the desired bimetallic crystal and permit it to crystallize out of solution.

What I claim is:
1. A method for the production of yttrium aluminum oxide garnet crystals comprising the steps of:
   forming a bath of molten sodium aluminum fluoride,
   dissolving into said molten bath aluminum oxide and yttrium oxide in molecular proportions corresponding to the equation $3Y_2O_3+5Al_2O_3 \rightarrow 2Y_3Al_5O_{12}$,
   increasing the temperature of said molten solution to above 1,210° C. after said oxides are added thereto,
   permitting the oxides to react with one another to form yttrium aluminum oxide within said molten solution according to said equation,
   decreasing the temperature of said solution to permit the yttrium aluminum oxide to crystallize thereout and recovering the yttrium aluminum oxide.

References Cited

UNITED STATES PATENTS 2,691,738    10/1954    Matthias _____ 23—52 X
3,294,701    12/1966    Vogel et al. _____ 23—52 X OSCAR R. VERTIZ, Primary Examiner.

HERBERT T. CARTER, Assistant Examiner.

U.S. Cl. X.R.
23—22, 52